United States Patent
Shrestha et al.

(10) Patent No.: US 10,333,785 B2
(45) Date of Patent: Jun. 25, 2019

(54) SERVER INFORMATION HANDLING SYSTEM CONFIGURATION BY PEER-TO-PEER NETWORKING

(71) Applicant: Dell Products L.P., Round Rock, TX (US)

(72) Inventors: Saurav Shrestha, Round Rock, TX (US); Robert Barrett, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1139 days.

(21) Appl. No.: 14/272,805

(22) Filed: May 8, 2014

(65) Prior Publication Data

US 2015/0326437 A1 Nov. 12, 2015

(51) Int. Cl.
*H04B 5/00* (2006.01)
*H04L 12/24* (2006.01)

(52) U.S. Cl.
CPC ....... *H04L 41/0846* (2013.01); *H04B 5/0025* (2013.01); *H04L 41/0806* (2013.01); *H04L 41/24* (2013.01)

(58) Field of Classification Search
CPC . H04L 41/0846; H04L 41/0806; H04L 41/24; H04B 5/0025
See application file for complete search history.

(56) References Cited

U.S. PATENT DOCUMENTS

| | | | | |
|---|---|---|---|---|
| 2003/0005104 A1* | 1/2003 | Deboer | ............... | G06F 9/44505 709/223 |
| 2006/0253693 A1* | 11/2006 | Kanodia | ................... | G06F 8/61 713/1 |
| 2008/0028048 A1* | 1/2008 | Shekar CS | .......... | G06F 9/44505 709/220 |
| 2008/0147831 A1* | 6/2008 | Redjaian | ................. | G06F 21/57 709/222 |
| 2009/0064763 A1* | 3/2009 | Comeau | ............... | G01N 27/205 73/37 |
| 2011/0218730 A1* | 9/2011 | Rider | ..................... | G01C 21/00 701/533 |
| 2012/0185579 A1* | 7/2012 | Watanabe | ............... | H04L 41/12 709/223 |
| 2012/0197972 A1* | 8/2012 | Tukol | .................. | G06F 9/44505 709/203 |
| 2013/0215467 A1* | 8/2013 | Fein | ...................... | G06F 3/1204 358/1.15 |
| 2013/0254521 A1* | 9/2013 | Bealkowski | ............ | G06F 9/445 713/2 |
| 2014/0106733 A1* | 4/2014 | Wei | ........................ | H04W 8/24 455/418 |

(Continued)

*Primary Examiner* — Scott B Christensen
(74) *Attorney, Agent, or Firm* — Zagorin Cave LLP; Robert W. Holland

(57) ABSTRACT

Server information handling system deployment and maintenance is enhanced with peer-to-peer configuration information transfers that allow a configuration from an existing server information handling system to be copied, modified and then pasted to another server information handling system. In one embodiment, the selection and use of peer-to-peer communications media is managed by a mobile telephone information handling system, such as with one or more of NFC, Bluetooth, and WLAN interfaces.

6 Claims, 3 Drawing Sheets

(56) References Cited

U.S. PATENT DOCUMENTS

| 2014/0134947 | A1* | 5/2014 | Stouder-Studenmund | H04W 8/005 |
| | | | | 455/41.2 |
| 2014/0199943 | A1* | 7/2014 | Bora | H04L 67/06 |
| | | | | 455/41.1 |
| 2014/0207902 | A1* | 7/2014 | Joshi | G06F 9/4401 |
| | | | | 709/217 |

* cited by examiner

SERVER INFORMATION HANDLING SYSTEM CONFIGURATION BY PEER-TO-PEER NETWORKING

BACKGROUND OF THE INVENTION

Field of the Invention

The present invention relates in general to the field of information handling system peer-to-peer communication, and more particularly to a server information handling system configuration by peer-to-peer networking.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Server information handling systems are typically centrally located in a data center that has specialized infrastructure to provide networking, power and cooling resources. Often, plural server information handling systems are stacked in racks that have plural slots to provide infrastructure interfaces. For example, a typical server rack includes multiple power supplies and a communication switch that each supports server information handling systems installed in slots of the rack. Racks are disposed in a room having a controlled environment, such as with cooling air vented near each rack. The server information handling systems typically include a baseboard management controller (BMC) that allows remote support operations, such as network-based power-up, power-down, component monitoring, firmware updates and other management operations. Generally, BMC's communicate with administrative tools through an out-of-band management network that is separate from the networks that the server information handling systems functionally serve. For instance, a server information handling system serves client requests responsive to enterprise functions performed over the Internet through a primary network interface and is managed by administrative network tools through a secondary management network.

In modern cloud networking configurations, physical server information handling systems provide physical processing resources that support virtual processing devices, such as virtual machines. As a result, in a given data center, a physical mapping of enterprise functions to the physical machine performing the enterprise functions is often not immediately available and frequently changing. In effect, the physical maintenance of server information handling systems is separate from the maintenance of virtual machines that run over the physical systems. As a physical server information handling system runs into difficulty executing an enterprise function, such as due to processing load or failure of components, the enterprise function virtual machine migrates to different physical resources. Although cloud networking helps to achieve efficient use of processing resources, it does tend to increase the difficulty of identifying and addressing physical processing resource failures and maintenance since there is little available direct relationship between difficulties in performing processing functions and difficulties with underlying physical processing resources.

One advantage of cloud computing and other virtualized networking techniques is that server information handling systems become black boxes that can fit into server racks as needed to replace broken server systems or to expand processing capabilities available for virtual systems. Information technology administrators often work on data center floors to address physical resource maintenance and replacement independent of functional resources running over the information handling systems. Once a server information handling system is repaired or replaced at a rack slot, the information technology administrator powers the server up and configures the server to interact with the management and functional network resources. After the server information handling system is under the control of administrative tools through the management network, remote management controls are typically effective to return the server information handling system into the pool of functional resources.

One difficulty with maintenance and replacement of server information handling systems is that information technology administrators must correctly configure the server information handling system to interact with network resources. A variety of sometimes complex configuration settings are typically loaded onto server information handlings systems in order to bring the server information handling systems on-line, such as IP version 4 and 6 addresses, boot order, security credentials. BMC management settings, etc. . . . . Manual server configuration typically requires USB or other inputs at a system deployed a rack after installation in the rack. In some instances where multiple server information handling systems are deployed to a rack at the same time, the information technology administrator performs multiple configurations in a repeated manner with slightly different configuration information at each server information handling system. Initial configurations of new server information handling systems tend to be cumbersome and time consuming through bezel-LCDs, keyboard-video-mouse switches and remote configuration methods. The complexity of initial deployments and configurations tends to increase where large numbers of similar server information handling systems are deployed in a common area at the same time.

SUMMARY OF THE INVENTION

Therefore a need has arisen for a system and method which supports copying of server information handling system configuration information from other server information handling systems in physical proximity.

In accordance with the present invention, a system and method are provided which substantially reduce the disadvantages and problems associated with previous methods and systems for configuration of a server information handling system. Peer-to-peer communications through an intermediary portable information handling system supports copying, modifying and pasting server information handling system configuration information from source to target systems of a data center.

More specifically, plural server information handling systems deployed in proximity to each other, such as in a common rack or data center, are configured on initial deployment or during maintenance by leveraging existing configuration information of installed server information handling systems. In one embodiment, an NFC transaction between a source server information handling system and a mobile telephone provides the source configuration information to the mobile telephone, such as by direct NFC transfer or coordination with network locations that store configuration information. An application running on the mobile telephone information handling system allows modification of the configuration information for use by a target information handling system server and coordinates transfer to the target, such as with an NFC transaction or network based communication. In another embodiment, identifiers for sources and/or targets of configuration information are gathered with NFC transactions to allow subsequent modification and transfer of configuration information from a remote location.

The present invention provides a number of important technical advantages. One example of an important technical advantage is that an information technology administrator is able to copy, modify and then paste a server configuration from an existing installed system to a new system that is in proximity with the installed system. The copy and paste operation is selectively managed through a variety of peer-to-peer networking interfaces, including near field communication (NFC), Wi-Fi, Bluetooth, smart-rack solutions, UPNP, etc. . . . . In one embodiment, an intermediary portable information handling system, such as a smartphone, coordinates the copy and paste operation. For example, NFC on a smartphone copies server information handling system configuration information from an installed BMC to the smartphone where an app supports modifications to the configuration information before pasting the modified configuration information to a newly installed server information handling system BMC. By using proximity-based tools, such as NFC, the information technology administrator is able to physically identify a system having a desired configuration, confirm the configuration and re-deploy the configuration in a few simplified steps that save time and reduce the risk of incorrectly configured systems in a data center.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Copying, modifying and pasting server information handling system configurations with peer-to-peer network communications reduces the time and complexity associated with deploying and maintaining server information handling systems in a common location. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
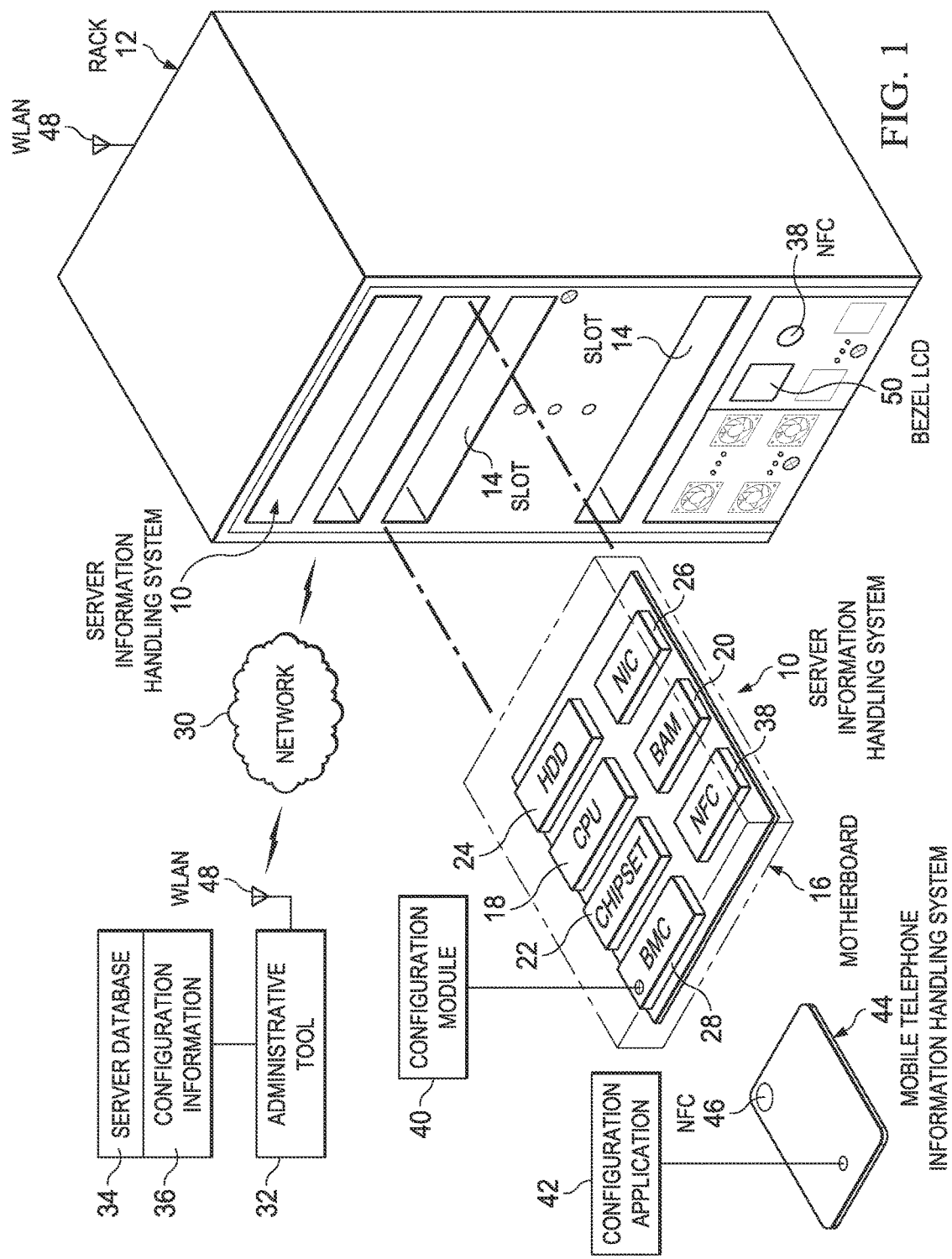
FIG. 1 depicts a block diagram of a system for peer-to-peer transfers of configuration information from source to target server information handling systems.

Referring now to FIG. 1, a block diagram depicts a system for peer-to-peer transfers of configuration information from source to target server information handling systems 10. Information handling systems 10 depicted by the example embodiment of FIG. 1 are co-located in a common rack 12 with each server information handling system 10 inserted in a slot 14 that provides power, cooling and wired networking infrastructure. Each server information handling system 10 processes information with components disposed on a motherboard 16, such as one or more central processing units (CPUs) 18 that executes instructions, random access memory (RAM) 20 that stores instructions and information, a chipset 22 that includes firmware to coordinate actions between the processing components, a hard disk drive (HDD) 24 that provides persistent storage, and one or more network interface cards (NICs) 26 that communicate with a wired network, such as Ethernet. Although the example embodiment illustrates configuration information transfers between server information handling systems 10 in the same rack 12, in other embodiments, various levels of proximity may be supported, such as the same rack 12, the same data center room or the same data center building.

Server information handling system 10 includes a management controller, such as a baseboard management controller (BMC) 28, which provides remote management functions through a network 30. For example, BMC 28 allows an administrative tool 32 to perform remote power up and power down as well as to perform maintenance, such as software and firmware patches. Administrative tool 32 tracks server hardware, software and security information with a server database 34 that stores server configuration information 36. For example, server database 34 maps the physical location of server information handling systems 10 to network addresses, such as Internet Protocol (IPv4 and/or IPv6) address and MAC address, and defines certain functions, such as boot device order, security credentials and management controller settings. During deployment of server information handling systems 10, configuration information is provided to BMC 28 through a local interface, such as an NFC 38 interfaced with BMC 28, so that a configuration module 40 running on BMC 28 applies the configuration information to interface server information handling system 10 with rack 14 network infrastructure. After configuration module 40 applies the configuration information, at BMC 28, administrative tool 32 is able to manage server information handling system 10 through a management interface communicated through network 30.

NFC 38 interfaced with BMC 28 allows access to configuration module 40 with a configuration application 42 executing on a portable information handling system, such as mobile telephone information handling system 44 or similar devices like tablets and laptops, have an integrated NFC 46. For example, an information technology administrator with a mobile telephone information handling system 44 executing configuration application 42 uploads configuration information with a transaction from NFC 46 to NFC 38 so that configuration module 40 applies the configuration information to BMC 28 for managing server information handling system 10. The end user manually enters the configuration information to configuration application 42 and verifies the deployment of the configuration information by confirming successful interaction of BMC 28 with network 30 and administrative tool 32. In one embodiment, mobile telephone information handling system 44 interfaces with administrative tool 32 through a wireless local area network (WLAN) 48 to confirm the success of a deployment. In some instances, multiple server information handling systems 10 are deployed at a rack 12 at the same time, such as when a set of new or replacement server information handling systems are purchased for use in a datacenter. In other instances, multiple server information handling systems 10 have configuration information changes or updates at the same time, such as during a reorganization or other reassignment of processing resources in a datacenter.

Configuration application 42 provides a number of alternatives to an information technology administrator in the deployment of configuration information. In one example, configuration application 42 accepts configuration information through an NFC transaction from a server information handling system that is already successfully deployed and installed at the data center, and presents the configuration information of the installed server information handling system to the information technology administrator on a display of mobile telephone information handling system 44. The information technology administrator is then able to edit the configuration information to adapt to an unconfigured server information handling system by making changes at the mobile telephone display, and to deploy the modified configuration information to the unconfigured server information handling system with an NFC transaction that provides the modified configuration information to the configuration module 40 of the unconfigured server information handling system. Configuration module 40 then applies the modified configuration information to configure the unconfigured server information handling system so that the information technology administrator configures the server information handling system with fewer manual inputs. In an alternative embodiment, a similar process provides configuration modifications to an installed server information handling system. In this manner, the information technology administrator is able to configure multiple server information handling systems with a copy, modify and paste operation performed by a series of NFC transactions.

Although NFC provides a secure and convenient peer-to-peer communication interface for the copy, modify and paste configuration operation, other types of interfaces may be used with and without NFC transactions. In one example embodiment, an LCD control interface 50 disposed on a bezel of a server information handling system 10 provides access to configuration module 40 for managing configuration information at the BMC 28 of the server information handling system 10. For example, an information technology administrator selects a server information handling system 10 to copy the configuration information and inputs commands at LCD 50 of that server information handling system 10 to have the configuration information sent by WLAN 48 to another location, such as mobile telephone information handling system 44 or to a BMC 28 of an unconfigured server information handling system 10 based upon location of a slot 14. In such an example, the configuration information may be modified at LCD 50 of the configured information handling system, at configuration application 42 or at LCD 50 of the unconfigured server information handling system. In other alternative embodiments, WLAN 48 may transfer configuration information through network 30 or with a peer-to-peer interface, Bluetooth may transfer configuration information, or other types of peer-to-peer communication techniques may be used. In one embodiment, configuration application 42 running on mobile telephone information handling system 44 may select an optimal available communication method for obtaining, modifying and pasting configuration information.

In another example embodiment, configuration information 36 from server database 34 is selected by an information technology administrator from mobile telephone information handling system 44, such as with a reference list of configurations. Once the selected configuration information is presented at configuration application 42, the administrator modifies the configuration information for use on another server information handling system. After modifying the configuration information, the administrator pushes the configuration through a network interface to the desired system. In one example embodiment, the administrator obtains an identifier from each of a set of newly installed server information handling systems by NFC transfer at each system. Once configuration application 42 has an identifier for each newly installed system, the administrator can perform the copy, modify and paste configuration by pushing each modified copy of the configuration information to a desired server information handling system 10 based upon the identifiers gathered with NFC transactions. This allows the administrator to finalized the configuration of the newly installed servers from any location that has network access.

Figure 2:
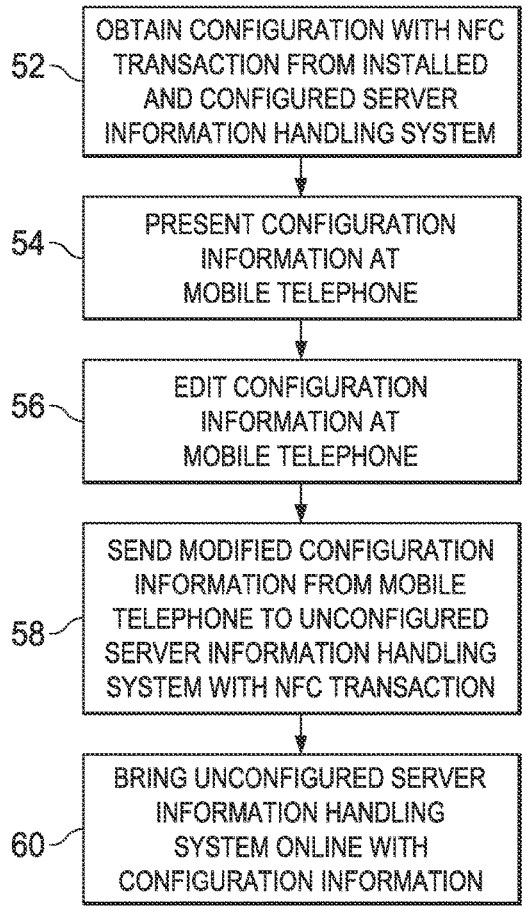
FIG. 2 depicts a flow diagram of a process for NFC transactions to obtain, modify and transfer configuration information between server information handling systems.

Referring now to FIG. 2, a flow diagram depicts a process for NFC transactions to obtain, modify and transfer configuration information between server information handling systems. The process starts at step 52 by obtaining configuration information with an NFC transaction from an installed and configured server information handling system to a mobile telephone application. At step 54, the configuration information is presented at the mobile telephone, such as in the user interface of a server management app running on the mobile telephone. At step 56, the mobile telephone user edits the configuration information from that retrieved from the installed information handling system to that needed by an unconfigured server information handling system. In an alternative embodiment, the edited configuration information is for loading on an installed server information handling system that needs reconfiguration. At step 58, the modified configuration information is sent from the mobile telephone to the unconfigured server information handling system with an NFC transaction. At step 60, the unconfigured server information handling system is brought on-line with the configuration information. In one example embodiment, an administrator who has loaded a rack with new server information handling systems is able to configure one system manually and then modify and paste a copy of the configuration information to rapidly configure the remaining server information handling systems with NFC transactions.

Figure 3:
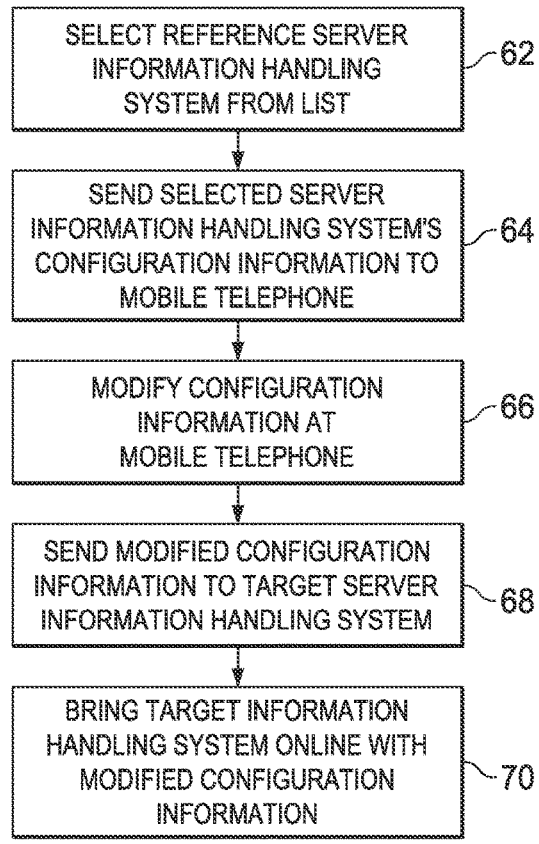
FIG. 3 depicts a flow diagram of a process for copying and pasting server information handling system configurations with a mobile telephone.

Referring now to FIG. 3, a flow diagram depicts a process for copying and pasting server information handling system configurations with a mobile telephone. At step 62, a reference server information handling system is selected from a list, such as a list of server information handling systems maintained in an administration tool. At step 64, the selected server information handling system's configuration information is sent to a mobile telephone, such as with a WLAN or WWAN communication. At step 66, a user of the mobile telephone modifies the configuration information at the mobile telephone to meet the needs of other server information handling systems. At step 68, the modified configuration information is sent to a target server information handling systems, such as with a push through the network, an NFC transaction or other peer-to-peer communication technique between the mobile telephone and the BMC of the target server information handling system. At step 70, the target server information handling system is brought on-line with the configuration information.

Figure 4:
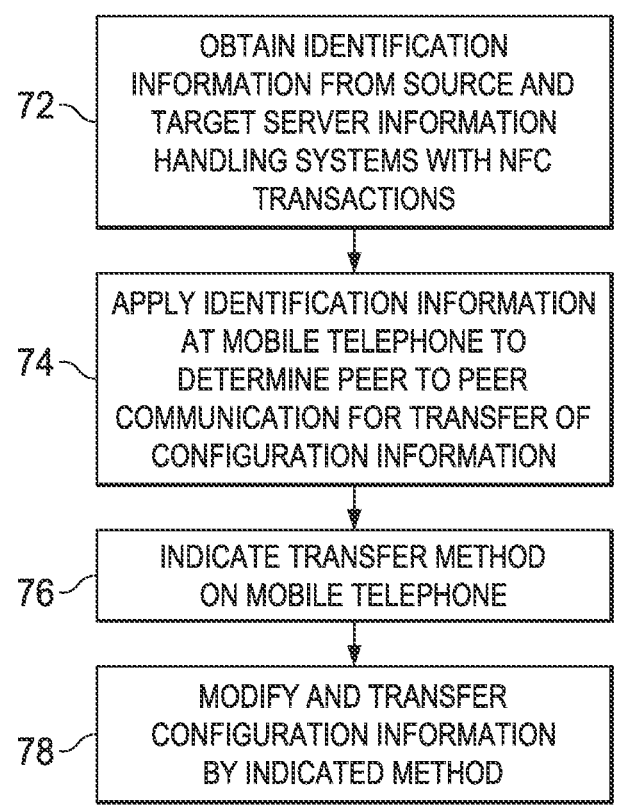
FIG. 4 depicts a flow diagram of a process for coordination of configuration information transfers between server information handling systems with NFC transactions.

Referring now to FIG. 4, a flow diagram depicts a process for coordination of configuration information transfers between server information handling systems with NFC transactions. The process starts at step 72 by obtaining identification information from source and target server information handling systems with NFC transactions. In alternative embodiments, some or all of target and/or source server information handling system identifications may be available from a data source, such as an administration tool or purchase order list. At step 74, the identification information is applied at the mobile telephone to determine a preferred peer-to-peer or other communication technique to transfer modified configuration information to target server information handling systems. At step 76, the transfer method is depicted on the mobile telephone for confirmation by a user of the mobile telephone. At step 78, the configuration information is modified for the target server information handling system and transferred by the indicated method. For example, the mobile telephone selects a network push if WLAN communication is available, selects Bluetooth peer-to-peer communication is WLAN is not available, and selects NFC if Bluetooth communication is not available. As another example, the mobile telephone selects NFC communication for an initial script download that provides subsequent configuration with WLAN communications between the target server information handling system BMC and mobile telephone through WLAN communications.

Although the present invention has been described in detail, it should be understood that various changes, substitutions and alterations can be made hereto without departing from the spirit and scope of the invention as defined by the appended claims.

What is claimed is:

1. A method for configuration of plural unconfigured server information handling systems, the method comprising:
    installing the plural unconfigured server information handling systems in a rack and interfacing each of the plural unconfigured server information handling systems with a network;
    identifying a proximately-located configured server information handling system;
    copying configuration information from a baseboard management controller (BMC) of the proximately-located configured server information handling system to a memory of a portable telephone information handling system with a first near field communication (NFC) transaction;
    modifying the configuration information in the memory to adapt to the unconfigured plural server information handling systems;
    retrieving by a second NFC transaction from each of the plural unconfigured server information handling systems an identifier of each unconfigured server information handling system; and
    copying the modified configuration information from the memory to a network location and then from the network location to the BMC of each of the plural unconfigured server information handling systems, the network location finding the unconfigured server information handling systems through the network by reference to the identifier of each unconfigured server information handling system, the plural identifiers communicated from the portable telephone information handling system to the network location, the network location interfacing with the unconfigured server information handling systems through the network by reference to the plural identifiers to push configuration information to each unconfigured information handling system.

2. The method of claim 1 wherein:
    modifying the configuration information in the memory further comprises modifying the configuration information with an application running on the portable telephone information handling system.

3. The method of claim 2 wherein:
    copying the modified configuration information further comprises selecting with the application one of plural communication techniques for communicating the modified configuration information to the BMC of the plural unconfigured server information handling systems; and
    copying the modified configuration information to the BMC of each the plural unconfigured information handling systems with the selected communication technique.

4. A system for deploying plural server information handling systems, the system comprising:
    a server information handling system management controller in each of the plural server information handling systems, each management controller storing a unique identifier;
    a configuration module stored in non-transitory memory of each of the plural server information handling system management controllers, the configuration module having instructions executed on the server information handling system management controller to maintain server configuration information and to communicate the server configuration information from the management controller to an external memory through a peer-to-peer communication, the server configuration information including at least the unique identifier; and
    a mobile information handling system operable to request the configuration information from the configuration module of each of the plural server information handling systems with a near field communication (NFC) transaction, and to provide the unique identifier of each of the plural server information handling systems to a network location, the network location having an interface to modify the configuration, and the network location pushing the modified configuration information to each of the unconfigured server information handling system management controllers from the network location by reference to the unique identifiers.

5. A method for transferring configuration information to a server information handling system management controller of each of plural unconfigured server information handling systems, the method comprising:
   obtaining, by a mobile telephone information handling system, configuration information from a first server information handling system management controller with a first near field communication (NFC) transaction information transfer;
   modifying, by the mobile telephone information handling system, the configuration information to adapt to each of the plural unconfigured server information handling system management controllers;
   providing, by the mobile telephone information handling system, the modified configuration information and the unique identifier to a network location;
   obtaining, by the mobile telephone information handling system, a unique identifier from each of plural unconfigured server information handling systems by a second NFC transaction with each unconfigured server information handling system; and
   copying the modified configuration information to each of the plural unconfigured server information handling system management controllers with a push transfer from the network location by reference to the unique identifier.

6. The method of claim 5 wherein the configuration information comprises a boot device order.

* * * * *